(12) United States Patent
Yip (10) Patent No.: US 10,460,260 B2
(45) Date of Patent: Oct. 29, 2019

(54) USER INTERFACE OVERLAY SYSTEM

(75) Inventor: Andrew Yip, Corvallis, OR (US)

(73) Assignee: Incisive Software Corporation, San Jose, CA (US)

( * ) Notice: Subject to any disclaimer, the term of this patent is extended or adjusted under 35 U.S.C. 154(b) by 612 days.

(21) Appl. No.: 13/426,431

(22) Filed: Mar. 21, 2012

(65) Prior Publication Data

US 2013/0024810 A1 Jan. 24, 2013

Related U.S. Application Data

(63) Continuation of application No. 12/062,486, filed on Apr. 3, 2008, now abandoned.

(51) Int. Cl.
*G06Q 10/00* (2012.01)
*G06F 9/451* (2018.01)

(52) U.S. Cl.
CPC ............ *G06Q 10/00* (2013.01); *G06F 9/451* (2018.02)

(58) Field of Classification Search
CPC .... G06F 3/0481; G06F 3/0482; G06F 3/0483; G06F 3/04817; G06F 3/04847; G06F 9/4443; G06F 2203/04804; H04N 5/44543; G06Q 10/10; G09G 5/14; G09G 2340/125
USPC ........................................ 715/810, 764, 790
See application file for complete search history.

(56) References Cited

U.S. PATENT DOCUMENTS

| | | | | |
|---|---|---|---|---|
| 5,250,929 A | * | 10/1993 | Hoffman et al. ............. | 715/823 |
| 5,577,188 A | * | 11/1996 | Zhu ....................... | G06F 3/0481 |
| | | | | 715/202 |
| 5,668,997 A | * | 9/1997 | Lynch-Freshner et al. .. | 719/329 |
| 5,721,847 A | * | 2/1998 | Johnson ................. | G06F 3/0481 |
| | | | | 715/209 |
| 7,415,664 B2 | * | 8/2008 | Aureglia ............... | G06F 17/246 |
| | | | | 715/212 |
| 7,429,993 B2 | * | 9/2008 | Hui ....................... | G06F 3/0481 |
| | | | | 345/592 |
| 7,559,034 B1 | * | 7/2009 | Paperny et al. .............. | 715/803 |

(Continued)

OTHER PUBLICATIONS

John Garry, Machine Vision Sensor, EP 1230787A2, pp. 1-21.*
John Garry, Machine Vision Sensor, EP 1230787A2, pp. 1-2.*

*Primary Examiner* — Scott T Baderman
*Assistant Examiner* — Erik V Stitt
(74) *Attorney, Agent, or Firm* — Larry E. Henneman, Jr.; Henneman & Associates, PLC (57) ABSTRACT

A method and system for providing an overlay window for an application to display augmentation data over the user interface of the application is provided. An overlay system includes an overlay component and an engine component that interface with the application and a presentation manager used by the application to provide the application window. When the overlay system starts up, it initializes the overlay component and the engine component. The overlay component tracks the portion of the application that is currently visible and displays augmentation data in an overlay window over the application window. The engine component provides augmentation functionality that generates the augmentation data and generates the overlay window based on the augmentation data. When the visible portion of the application data changes, the overlay component requests the engine component to generate the overlay window for the currently visible application data.

37 Claims, 9 Drawing Sheets

(56) References Cited

U.S. PATENT DOCUMENTS

| | | | | |
|---|---|---|---|---|
| 7,904,823 B2* | 3/2011 | Beauchamp | ......... | G06F 3/0481 715/768 |
| 8,281,339 B1* | 10/2012 | Walker et al. | ................... | 725/45 |
| 8,316,450 B2* | 11/2012 | Robinson et al. | .............. | 726/26 |
| 8,352,983 B1* | 1/2013 | Chane et al. | .................... | 725/43 |
| 8,621,385 B2* | 12/2013 | Sauermann | ......... | G06F 3/04855 715/212 |
| 9,575,655 B2* | 2/2017 | Rytivaara | .............. | G06F 1/1626 |
| 2002/0069415 A1* | 6/2002 | Humbard et al. | .............. | 725/52 |
| 2003/0084449 A1* | 5/2003 | Chane et al. | .................... | 725/46 |
| 2003/0193481 A1* | 10/2003 | Sokolsky | ...................... | 345/173 |
| 2004/0100490 A1* | 5/2004 | Boston et al. | ................. | 345/744 |
| 2005/0216856 A1* | 9/2005 | Matti | ........................... | 715/768 |
| 2006/0061597 A1* | 3/2006 | Hui | ....................... | G06F 3/0481 345/629 |
| 2006/0136829 A1* | 6/2006 | Abbar | .................. | G06F 9/4443 715/744 |
| 2007/0028183 A1* | 2/2007 | Ostojic | ............. | H04N 7/17318 715/768 |
| 2008/0163090 A1* | 7/2008 | Cortright | ............. | G06F 3/0481 715/771 |
| 2009/0125544 A1* | 5/2009 | Brindley | ....................... | 707/102 |

* cited by examiner

FIG. 1 engine data structure 300 cell table 124

| cell id | status | IDisplayObject |
|---|---|---|
| A1 | audited | |
| A2 | not audited | | region table 125

| region id | cell range | status | IDisplayObject |
|---|---|---|---|
| R1 | A1 ... D5 | suspect | |

FIG. 3 overlay data structure 200 visible cell table 113

| cell id | location |
|---|---|
| A1 | (101, 101) (120, 200) |
| A2 | (121, 100) (140, 200) |

USER INTERFACE OVERLAY SYSTEM

CROSS-REFERENCE TO RELATED APPLICATION

This application is a continuation of U.S. patent application Ser. No. 12/062,486, entitled "USER INTERFACE OVERLAY SYSTEM," filed Apr. 3, 2008, the entirety of which application is incorporated herein by reference.

BACKGROUND

A spreadsheet program is a computer application that displays multiple cells that together make up a grid consisting of rows and columns, called a spreadsheet. Each cell contains an alphanumeric value, a numeric value, or a formula. When cells are displayed, the alphanumeric value or numeric value of each cell is displayed. If, however, a cell contains a formula, then the value of that formula is calculated to generate an alphanumeric or numeric value that is then displayed for the cell. A formula may be defined in terms of mathematical operations (e.g., addition or multiplication), mathematical functions (e.g., net present value), and nonmathematical functions (e.g., a table lookup) that can be performed on various operands. The operands may include constant alphanumeric or numeric values or may include references to other cells. When a formula references another cell, then the value of the other cell is used as the operand. The other cell may itself contain an alphanumeric value, a numeric value, or a formula. If the other cell contains a formula, then that formula may have operands that reference yet other cells. Thus, the value of one cell may depend on the values of many other cells either directly (i.e., as operands of the formula that explicitly reference another cell) or indirectly (e.g., as operands of the formula of an explicitly referenced cell that itself contains a formula that references another cell). Whenever a value of a cell changes, the spreadsheet recalculates the value of any cell whose value depends directly or indirectly on the value of that cell.

Spreadsheet programs have become very popular, especially for financial analysis. A spreadsheet that supports sophisticated financial analyses can be very large and quite complex. It is not uncommon for spreadsheets to contain thousands of cells with very complex formulas and data dependencies. Because of the complexity and size of these spreadsheets, it can be difficult for the developer of a spreadsheet to ensure that the spreadsheet performs the desired calculations. Even simple typographical errors in a formula (e.g., AB256 rather than AB255) can result in subtle errors that are difficult to detect.

A developer of a spreadsheet may provide the spreadsheet to others, such as customers, so that they can use the spreadsheet to calculate values based on their own initial data. To do so, the developer would provide a file containing the spreadsheet that can be loaded using the spreadsheet program and initialized with data of the customer as appropriate. The spreadsheet program then calculates the values of the spreadsheet based on the data.

Tools can be provided to help a person (e.g., a developer or customer of a developer) ensure the correctness of a spreadsheet. As part of ensuring the correctness, the tools may point out potential problems to the user or may point out portions of the spreadsheet whose correctness has been verified. These tools could provide a static report of their results. For example, a tool may provide a user interface that lists cells by their identifier (e.g., "A1") with suspect formulas. Some tools could even modify the spreadsheet to help highlight these problems. For example, a tool might change the background color of a suspect cell to red. Unfortunately, once a tool starts to modify a spreadsheet, it can be extremely difficult to determine whether the cause of a problem is the spreadsheet as provided by the developer or modification to the spreadsheet.

DETAILED DESCRIPTION

A method and system for providing an overlay window for an application to display augmentation data over the user interface of the application is provided. In some embodiments, an overlay system includes an overlay component and an engine component that interlace with the application and a presentation manager used by the application to provide the application window. For example, the application may be a spreadsheet program such as MICROSOFT EXCEL, and the presentation manager may be the user interface functionality provided by an operating system such as MICROSOFT WINDOWS. In the following, the overlay system will be described as used in conjunction with a spreadsheet program. One skilled in the art will, however, appreciate that the overlay system can be adapted to be used with many different types of applications, such as drawing programs, word processing programs, tax preparation programs, database programs, and so on. The overlay system may be implemented as an add-in to the spreadsheet program. When the add-in is launched, the overlay system starts up the overlay component and the engine component. The overlay component tracks the portion of the spreadsheet that is currently visible in the spreadsheet window and displays overlay elements in an overlay window over the spreadsheet window. The engine component provides augmentation functionality that generates the augmentation data and generates the overlay window by adding overlay elements that are derived from the augmentation data. For example, the augmentation functionality may be to track an auditor's review of a spreadsheet by marking cells or regions of cells as not audited, correct, suspect, and so on. When the cells that are currently visible change, the overlay component requests the engine component to generate the overlay window for the currently visible cells. For example, the engine component may add overlay elements to the overlay window so that correct cells have a green background, suspect cells have a red background, and so on. The engine component may also add overlay elements to the overlay window for various controls (e.g., buttons, drop-down list, combo-boxes, or free form boxes) through which engine component can interact with user to support the augmentation functionality. The overlay component then displays the overlay window over the spreadsheet window to effect the display of the overlay elements over the spreadsheet. To the user, it looks as if the spreadsheet was actually modified to include the overlay elements in part because the overlay window may have no visible manifestation (e.g., no borders) except for the overlay elements. When the user interacts with the overlay window (e.g., via the controls), the overlay component notifies the engine component so that it can implement its user interface functionality. For example, an auditor may place an "x" or a "✓" on a cell to indicate whether the cell has been verified as being incorrect or correct. In addition, the overlay system allows the augmentation data to be stored separately from the spreadsheet data either persistently or non-persistently. Thus, the overlay system provides visual feedback to a user as to the status of cells without having to modify the spreadsheet. In addition, the overlay system provides an architecture in which different engine components can be developed to provide different augmentation functionality that can take advantage of the overlay functions provided by the overlay component.

In some embodiments, the overlay component tracks the current "cell visibility" by registering with the presentation manager to receive events of the user interface of the application, registering with the application to receive its events, and in some cases registering with the engine component to receive events that may in some way affect the current cell visibility, For example, whenever a user scrolls a spreadsheet, the cell visibility changes. When the overlay component detects a change in cell visibility, it requests the engine component to update the overlay window so that the correct overlay elements can be displayed for the currently visible cells. The overlay component may use subclassing functionality of the presentation manager to intercept events for the spreadsheet window and may use a layering functionality to layer the overlay window over the spreadsheet window. The layering functionality may allow the underlying cells to be seen through the overlay window. The engine component may cause a change in background color, a change in outlining of cells, a tool tip to appear, controls to be displayed, and so on. The overlay component may also use the application programming interface ("API") of the spreadsheet program to register to receive callbacks for various events. In addition, the overlay component may need to register with the presentation manager to receive events for various other auxiliary windows of the spreadsheet program, such as scroll bars. Because the overlay component receives events from both the presentation manager and the application, it can provide functionality that would not be possible if only presentation manager events or only application events were received. If only presentation manager events were received, then the overlay component could not determine, for example, what cells become visible when the user scrolls the applicant window, Similarly, if only application events were received, then the overlay component could not determine the location of the application window.

The architecture of the overlay system defines an interface through which the overlay component and the engine component interact. As a result, the overlay component can be used with different implementations of engine components that provide different augmentation functionality. In some embodiments, the engine component exposes an overlay support interface, a display object interface, and a display manager interface to the overlay component, and the overlay component exposes an overlay view interface to the engine component. The overlay support interface provides a mechanism for the overlay component to receive events detected by the engine component that may cause a change in the overlay window even though the cell visibility has not changed. For example, the engine component may detect that a user has selected a different cell without affecting cell visibility. In such a case, the engine component may want to change the overlay window in some way to indicate that a different cell has been selected. The overlay support interface also provides a mechanism through which the overlay component can retrieve references to the display object interfaces for display objects for controlling the generating of the overlay window for the currently visible cells. For example, the engine component may provide a reference to a display object interface for each cell that is currently visible, for each region of cells that is currently visible, or for only those areas over which controls are to be displayed. The overlay component can invoke methods of those display object interfaces to generate the overlay window, The object manager interface may provide a mechanism for the overlay and engine components to exchange interfaces and methods for the overlay component to notify the engine component of certain events, such as a cell selection change. The overlay view interface that is exposed by the overlay component may provide cell visibility information or other information that may be needed by the engine component.

Figure 1:
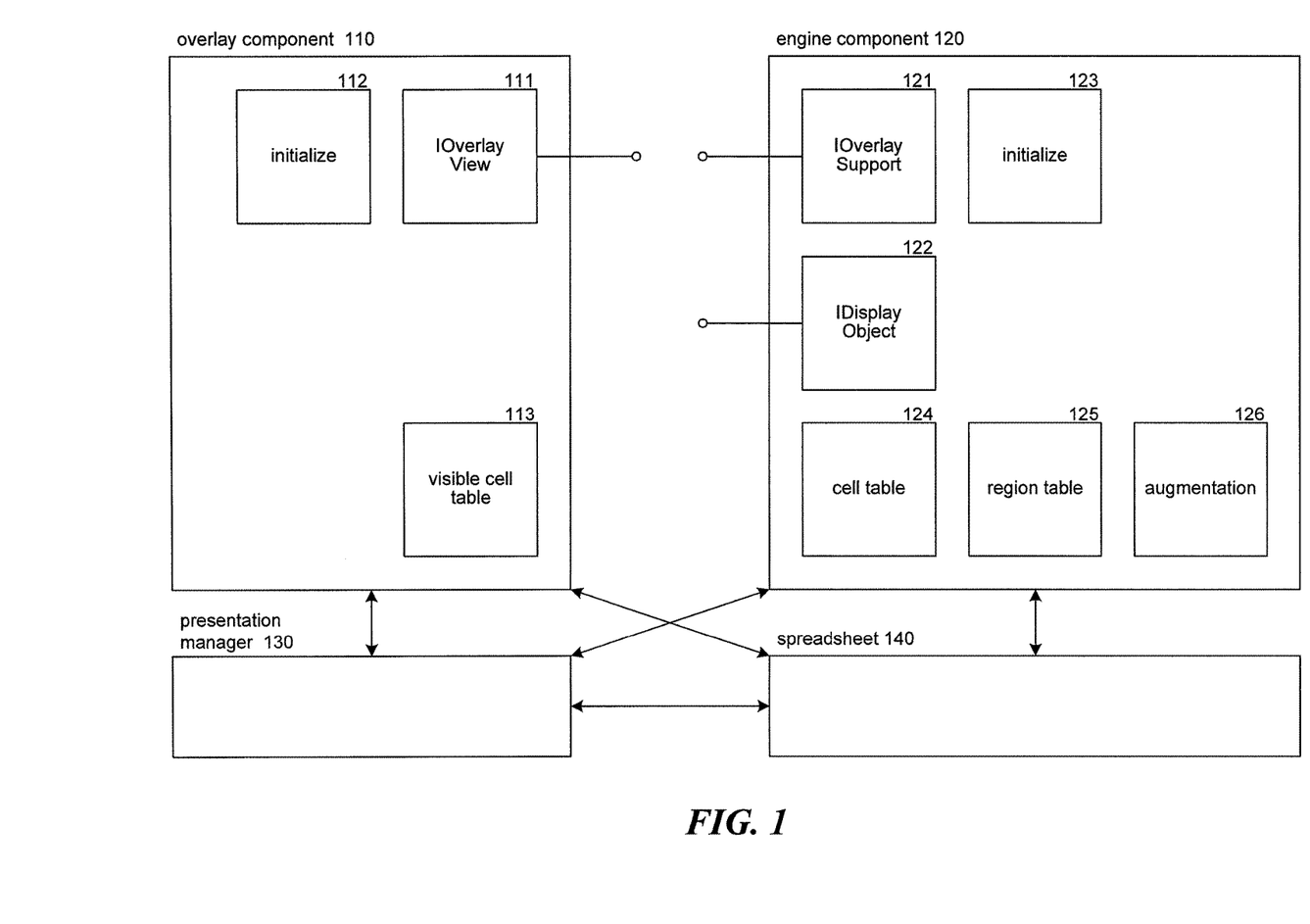
FIG. 1 is a block diagram illustrating the architecture of the overlay system in some embodiments.

FIG. 1 is a block diagram illustrating the architecture of the overlay system in some embodiments. The overlay system includes an overlay component 110 and an engine component 120. The overlay component includes an overlay view interface 111, an initialize component 112, and a visible cell table 113. The overlay view interface provides the engine component with access to visibility information of the spreadsheet. The initialize component is invoked at startup of the overlay system to initialize the overlay component. The visible cell table contains information describing cell visibility. The engine component includes an overlay support interface 121, a display object interface 122, an initialize component 123, a cell table 124, a region table 125, and an augmentation component 126. Although not illustrated, the overlay system may also include an object manager interface that is described below. The overlay support interface provides the overlay component with access to events recognized by the engine component and access to the display object interfaces. The display object interface includes methods for generating the overlay window based on the augmentation functionality. The initialize component is invoked at startup of the overlay system to initialize the engine component. The cell table and the region table contain augmentation data of the engine component when the engine component provides auditing functionality. Different data structures would be used when the engine component provides different functionality. The augmentation component provides the augmentation functionality of the engine component. The overlay component and the engine component each interact with a presentation manager 130 and a spreadsheet 140 to register for and receive event information and/or to generate their user interfaces. The spreadsheet component also interacts with the presentation manager to generate its user interface.

Figure 2:
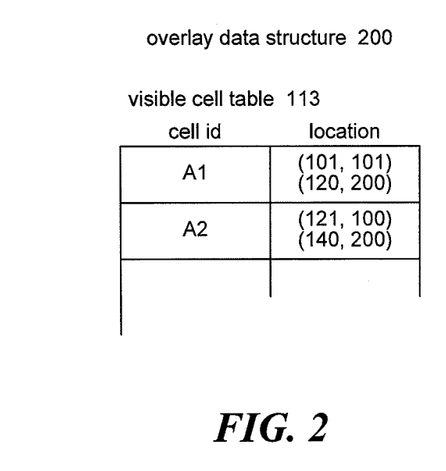
FIG. 2 is a block diagram that illustrates data structures of the overlay component in some embodiments.

FIG. 2 is a block diagram that illustrates data structures of the overlay component in some embodiments. The overlay component includes an overlay data structure 200 that may include a visible cell table 113. The visible cell table contains an entry for each cell of the spreadsheet that is currently visible. Each entry may include a cell identifier (e.g., "A1") and the location of the cell relative to the spreadsheet window defined by, for example, the upper left and lower right corner of the cell in pixels. The overlay data structure may also include a display object interface table that includes a reference to each display object interface provided by the engine component for use in generating the overlay window. The overlay component may repopulate the entire visible cell table every time there is a change in cell visibility. Alternatively, the overlay system may be developed to track deltas in cell visibility and update the visible cell table and the overlay window accordingly. For example, if the cell visibility changes by the left column of cells becoming not visible and a new right column of cells becoming visible, then the overlay component may request from the engine component the display object interfaces for the newly visible cells of the right column only and discard the display object interfaces for the left column that is no longer visible (assuming that the overlay component can identify which display object interfaces affect which cells). The overlay component can then completely regenerate the overlay window or may alternatively shift the previous overlay window and invoke the display object interfaces for only the newly visible cells.

Figure 3:
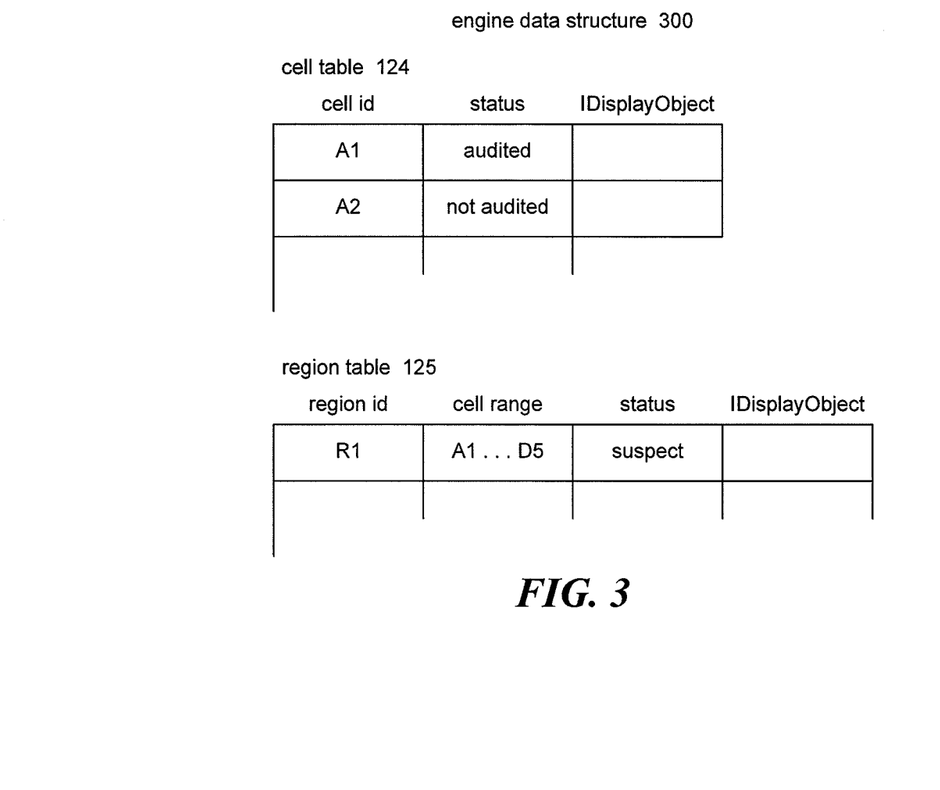
FIG. 3 is a block diagram that illustrates data structures of the engine component in some embodiments.

FIG. 3 is a block diagram that illustrates data structures of the engine component in some embodiments. The engine data structure 300 may include a cell table 124 and a region table 125 to support augmentation functionality relating to auditing of a spreadsheet. The cell table may contain an entry for each cell of the spreadsheet that identifies the cell (e.g., "A1"), indicates the current status of the cell (e.g., not audited), and includes a reference to a display object interface for that cell. The region table may contain an entry for each region of the spreadsheet. A region may correspond to contiguous cells that the engine component determines are related automatically (e.g., similar formulas) or based on user input. Each entry of the region table identifies the region (e.g., "R1"), the cell range of the region (e.g., "A1. . . D5"), the status of the region (e.g., "suspect"), and a reference to a display object interface for that region. The engine component may populate the cell table and the region table based on augmentation data that is stored in a file separate from the spreadsheet data. The augmentation component of the engine component modifies the augmentation data based on user input or based on analysis of the data of the spreadsheet.

The computing device on which the overlay system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the overlay system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the overlay system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The overlay system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The data structures illustrated include logical representations of data. The actual organization of the data structures may include hash tables, indexes, trees, and so on.

The overlay support interface may be defined as follows:

```
interface IOverlay Support
{
    event Eventhandler DataChanged;
    event Eventhandler SelectionChanged;
    event Eventhandler SheetRenamed;
    . . .
    List GetDisplayObjectsForRange (range);
}
```

The event handlers are defined to indicate various conditions detected by the engine component that should result in a regeneration of the overlay window. At initialization, the overlay component subscribes to these events. When the engine component invokes an event handler of the interface (i.e., publishes an event), the overlay component receives an event notification. Upon receiving the event notification, the overlay component calls the display object interfaces to update the overlay window. The get display objects for range method is invoked by the overlay component to retrieve from the engine component a list of references to display object interfaces for cells or regions within the specified range.

The display object interface may be defined as follows:

```
interface IDisplayObject
{
    void Paint (graphicsbuffer, area, . . .);
    void PaintWithMouseHover (graphicsbuffer, area, . . .);
    void HandleClick (graphic buffer, area, . . .);
    . . .
}
```

Each method is for generating an area (e.g., a cell, a region, or an area for a control) of the overlay window under different conditions. The paint method is invoked by the overlay component when the overlay for the area is to be regenerated. The graphics buffer represents the bitmap for the overlay window, and the area represents the area in the graphics buffer for the cell. The paint with mouse hover method is invoked by the overlay component when the user hovers a mouse over a cell. In such a case, the engine component may want to display a tool tip near the cell or highlight the cell. The handle click method is invoked via the overlay component whenever a user clicks on an area of the overlay window that has been generated by a display object interface. When the user clicks on an area, the engine component may want to highlight the underlying cell and collect augmentation data for that cell in a separate window or use the click as an indication of augmentation data (e.g., clicking on an area that contains a "✓" to indicate that a cell is correct.

Figure 4:
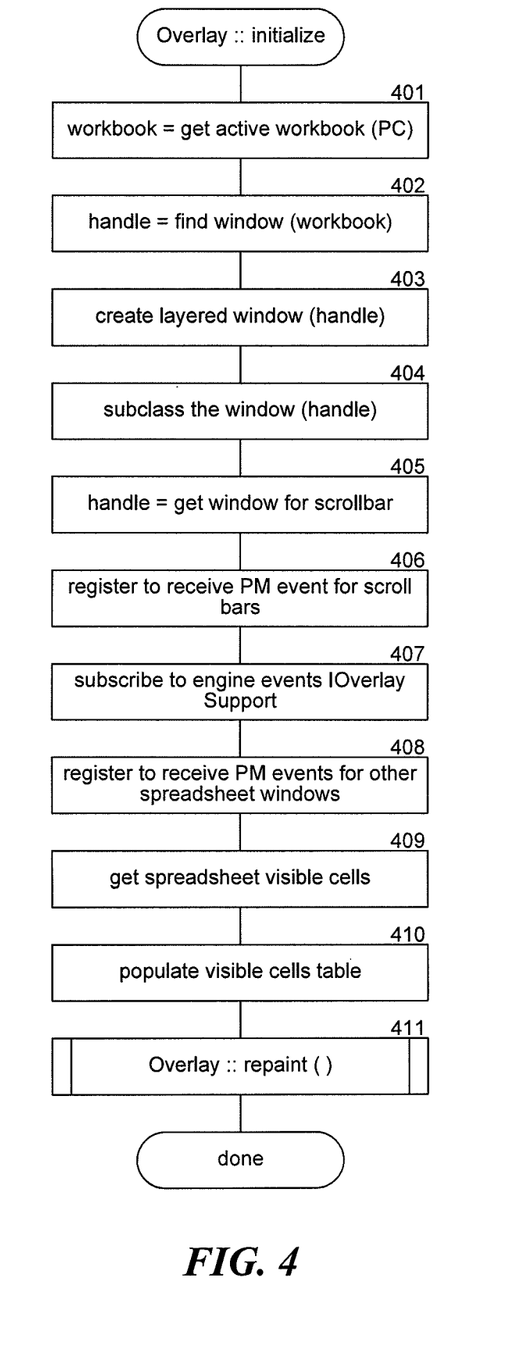
FIG. 4 is a flow diagram that illustrates the processing of the initialize component of the overlay component in some embodiments.

FIG. 4 is a flow diagram that illustrates the processing of the initialize component of the overlay component in some embodiments. The initialize component is invoked when the overlay system first starts up. In block 401, the component may retrieve from the spreadsheet an indication of the currently active workbook of the spreadsheet. In some embodiments, the overlay component may be adapted to handle multiple panes that may be displayed by a spreadsheet program. In such a case, similar functionality would be performed on a pane-by-pane basis. In block 402, the component retrieves a handle to the spreadsheet window for the currently active workbook. In block 403, the component creates the overlay window as a layered window of the spreadsheet window, The layering allows the overlay window to receive user input that is directed to an area of the overlay window that contains generated graphics (e.g., a control). Other user input is sent directly to the underlying application window. In block 404, the component registers to receive messages by subclassing the spreadsheet window. The subclassing will allow the overlay window to intercept the events of the spreadsheet window. In block 405, the component retrieves handles for the scroll bars of the spreadsheet window. The scroll bars may be represented by separate windows of the presentation manager. In block 406, the component registers to receive event notifications for the scroll bars. In block 407, the component subscribes to events generated by the engine component via the overlay support interface. In block 408, the component registers with the presentation manager to receive events for various other windows of the spreadsheet program. In block 409, the component invokes an API of the spreadsheet application to identify the cells that are currently visible. In block 410, the component populates the visible cell table. In block 411, the component invokes repaint method of the overlay component to effect the initial generation and display of the overlay window.

Figure 5:
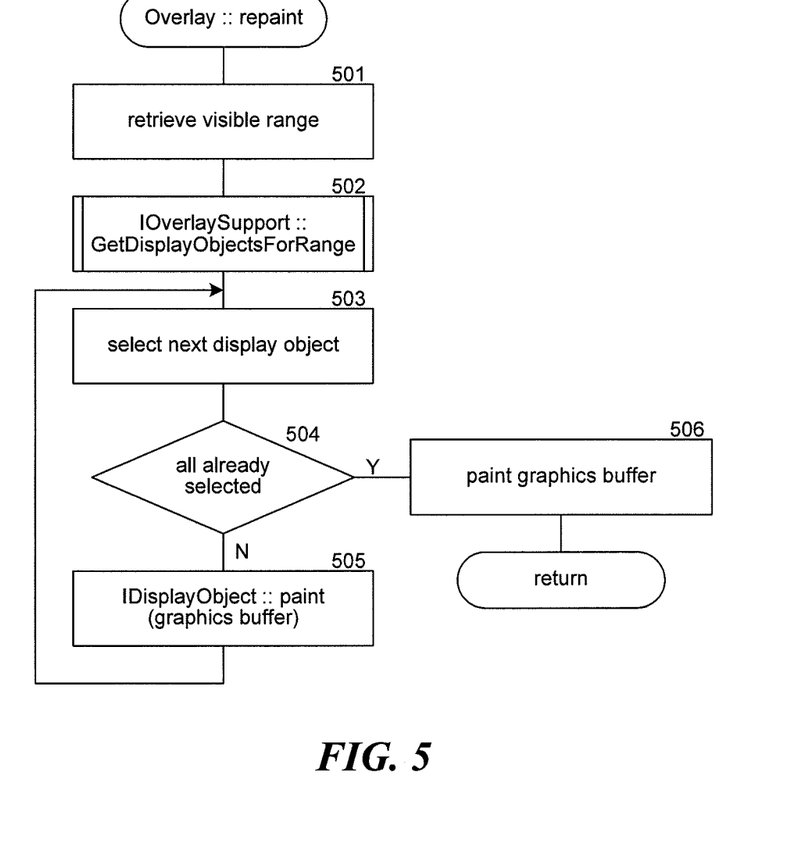
FIG. 5 is a flow diagram that illustrates the processing of the repaint component of the overlay component in some embodiments.

FIG. 5 is a flow diagram that illustrates the processing of the repaint component of the overlay component in some embodiments. The component is invoked to generate and display the overlay window. In block 501, the component retrieves the range of visible cells from the visible cell table. In block 502, the component invokes the get display objects for range component of the overlay support interface to retrieve the display object interfaces for all those cells or regions that are currently visible. In blocks 503-505, the component loops invoking the paint method of each display object interface. In block 503, the component selects the next display object interface. In decision block 504, if all such display object interfaces have already been selected, then the component continues at block 506, else the component continues at block 505. In block 505, the component invokes the paint method of the selected display object interface passing a graphics buffer representing the overlay window. The component then loops to block 503 to select the next display object interface. In block 506, the component effects the display of the graphics buffer as the overlay window and then returns.

Figure 6:
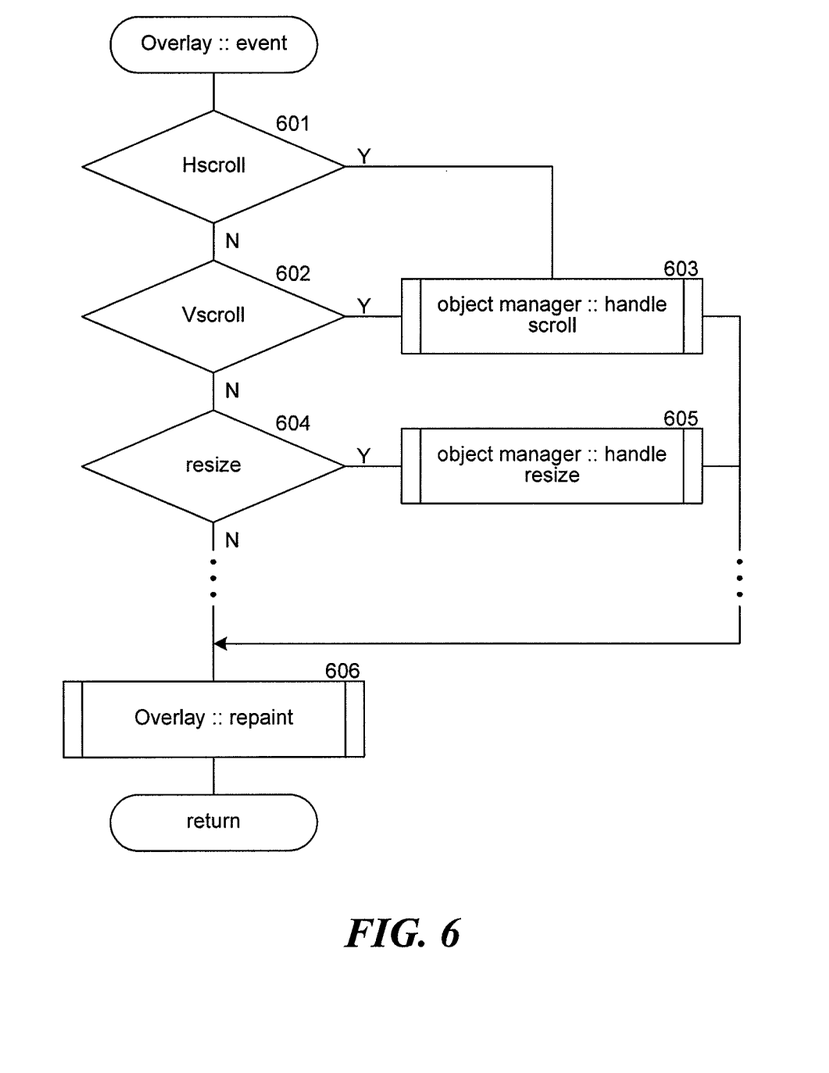
FIG. 6 is a flow diagram that illustrates the processing of an event processing component of the overlay component in some embodiments.

FIG. 6 is a flow diagram that illustrates the processing of an event processing component of the overlay component in some embodiments. The component is invoked whenever an event notification is received by the overlay component. The component identifies the event, performs the appropriate processing, and regenerates and displays the overlay window. In decision blocks 601-602, if the event indicates a scroll of the spreadsheet window, then the component continues at block 603, else the component continues at block 604. In block 603, the component invokes the handle scroll method of the object manager interface to notify the engine component that the scroll bars have been used to scroll the spreadsheet window. In decision block 604, if the event indicates that the spreadsheet window has been resized, then the component continues at block 605, else the component continues to identify the event as indicated by the ellipsis. In block 605, the component invokes the handle resize method of the object manager interface to notify the engine component. In block 606, the component invokes the repaint component of the overlay component to regenerate and display the overlay window.

Figure 7:
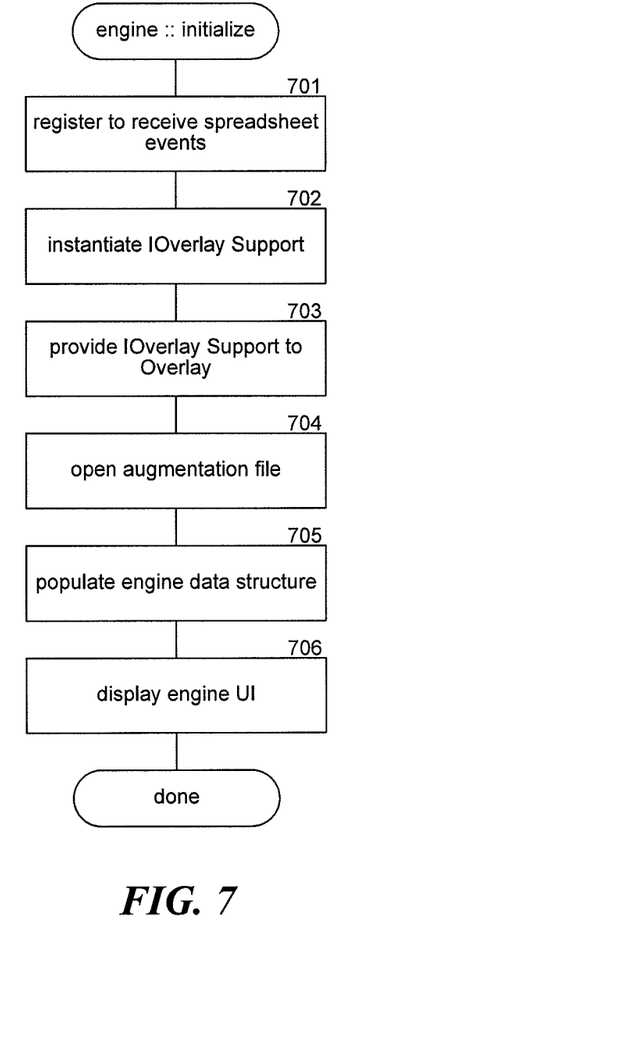
FIG. 7 is a flow diagram that illustrates the processing of the initialize component of the engine component in some embodiments.

FIG. 7 is a flow diagram that illustrates the processing of the initialize component of the engine component in some embodiments. The component is invoked at the startup of the overlay system. In block 701, the component registers to receive spreadsheet events that affect cell visibility (e.g., selection of a cell that is not currently visible). In block 702, the component instantiates the overlay support interface. In block 703, the component provides a reference to the overlay interface to the overlay component. In block 704, the component opens an augmentation file that contains the augmentation data, Alternatively, the component may create an augmentation file and initialize it. In block 705, the component populates the engine data structure including the cell table and the region table with data from the augmentation file. In block 706, the component may display a user interface for the engine component.

Figure 8:
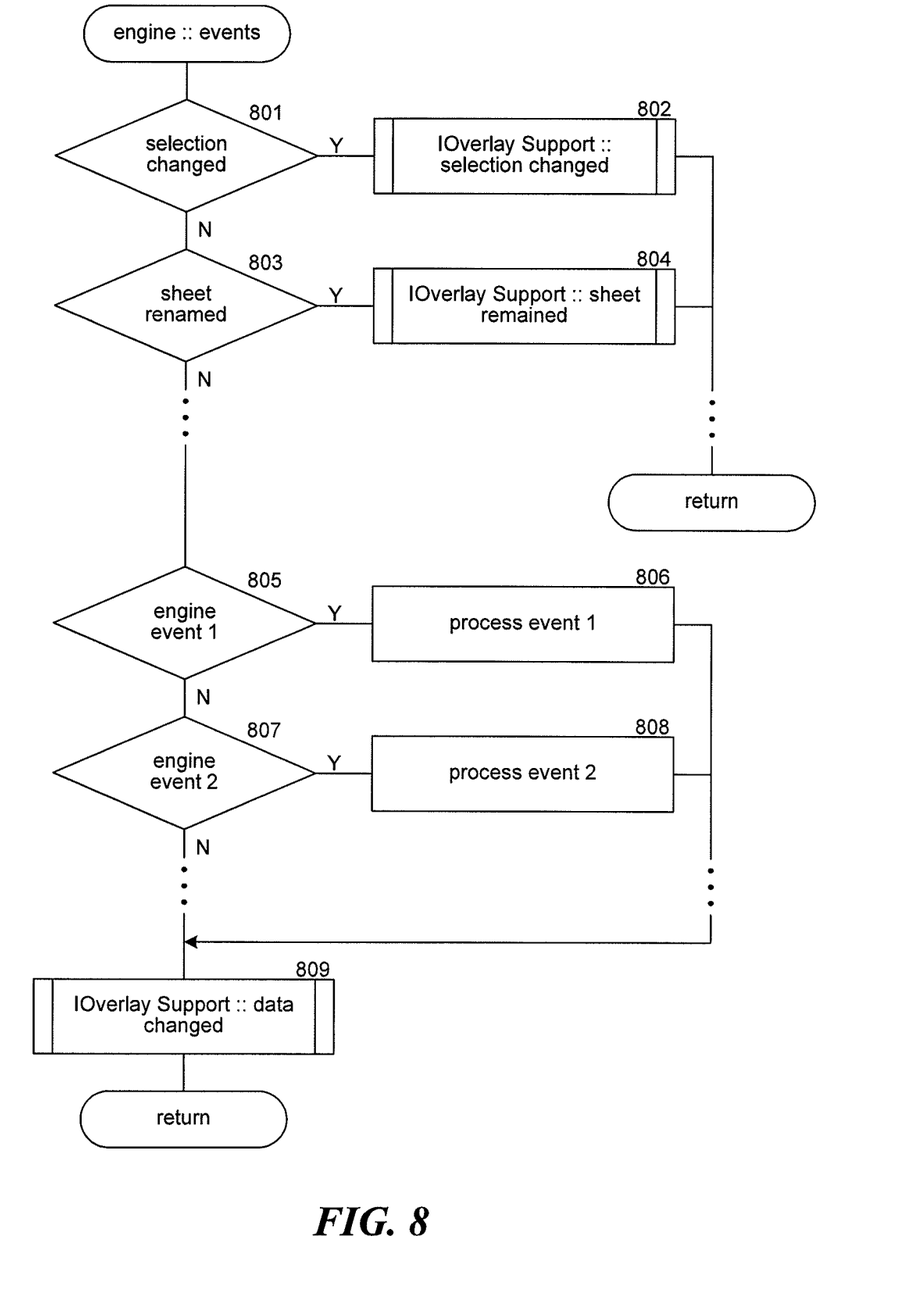
FIG. 8 is a flow diagram that illustrates the processing of an events component of the engine component in some embodiments.

FIG. 8 is a flow diagram that illustrates the processing of an events component of the engine component in some embodiments. The component is invoked whenever an event is received by the engine component. The events may include cell visibility events or events related to the generation of the augmentation data of the engine component. In decision block 801, if the cell selection has changed, then the component continues at block 802, else the component continues at block 803. In block 802, the component invokes the selection changed method of the overlay support interface to notify the overlay component that the cell selection has changed and then returns. In decision block 803, if the event indicates that a sheet has been renamed, then the component continues at block 804, else the component continues to identify events as indicated by the ellipsis. In block 804, the component invokes a sheet renamed method of the overlay support interface to notify the overlay component that a sheet has been renamed and then returns. In decision block 805, if another engine event has been identified, then the component continues at block 806 to process the event, else the component continues at block 807. In decision block 807, if another engine event has been identified, then the component processes that event in block 808, else the component continues to identify events as indicated by the ellipsis. In block 809, the component invokes the data changed component of the overlay support interface to notify the overlay component that the data of the overlay window needs to be updated, The component then returns.

Figure 9:
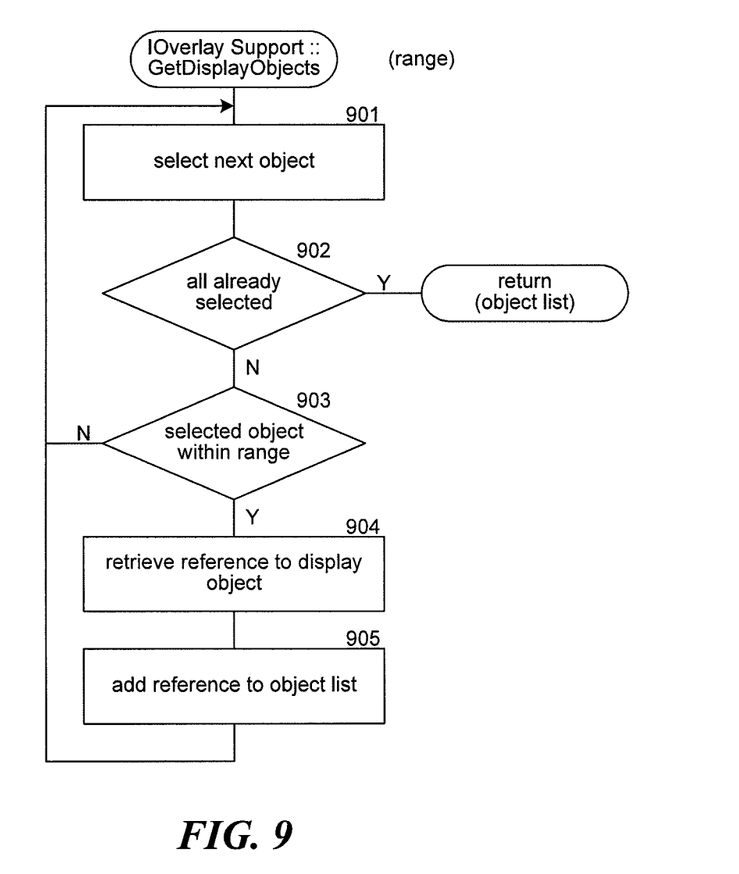
FIG. 9 is a flow diagram illustrating the processing of the get display objects for range method of the overlay support interface of the engine component in some embodiments.

FIG. 9 is a flow diagram illustrating the processing of the get display objects for range method of the overlay support interface of the engine component in some embodiments. The component loops selecting each object (e.g., cell or region) within the passed range and adding its display object interface to a list. In block 901, the component selects the next object of the spreadsheet. In decision block 902, if all the objects have already been selected, then the component returns an indication of the object list, else the component continues at block 903. In decision block 903, if the selected object is within the range, then the component continues at block 904, else the component loops to block 901 to select the next object. In block 904, the component retrieves a reference to the display object interface for the selected object. In block 905, the component adds the reference to the object list and then loops to block 901 to select the next object of the spreadsheet.

Figure 10:
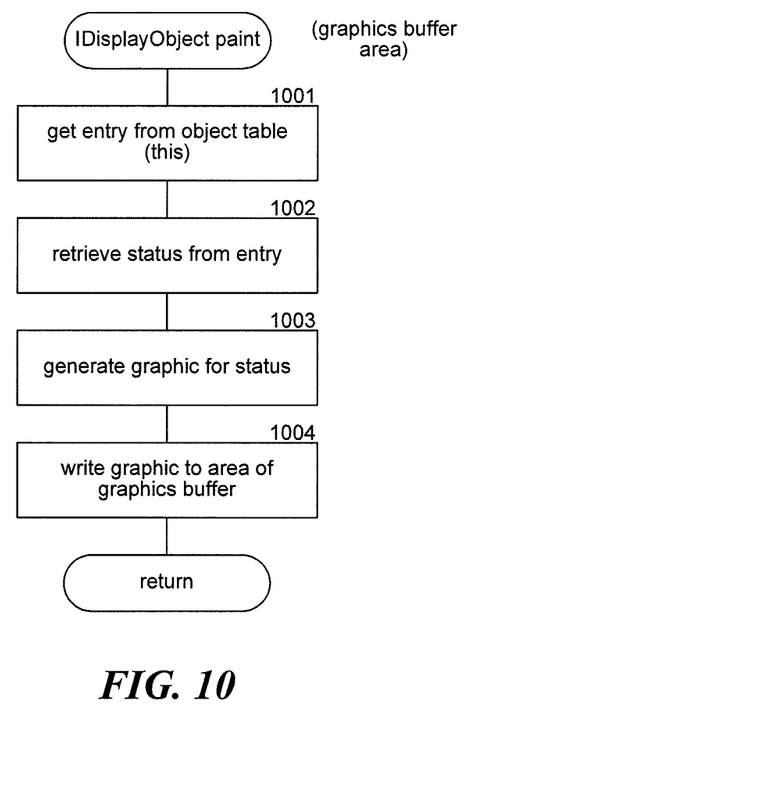
FIG. 10 is a flow diagram that illustrates the processing of the paint method of the display object interface in some embodiments.

FIG. 10 is a flow diagram that illustrates the processing of the paint method of the display object interface in some embodiments. The component is passed a graphics buffer and an area within the graphics buffer so that the engine component can update the graphics buffer based on the augmentation data for the object (e.g., cell or region) represented by the display object interface. In block 1001, the component retrieves the entry from the cell table or region table for this object. In block 1002, the component retrieves the status from the entry. In block 1003, the component generates the graphic for the status. In block 1004, the component writes the graphic to the area of the graphics buffer and then returns.

From the foregoing, it will be appreciated that specific embodiments of the invention have been described herein for purposes of illustration, but that various modifications may be made without deviating from the spirit and scope of the invention. For example, if the application is a word processing application, then the overlay component may track visible objects such as words, phrases, sentences, or paragraphs of a document. The engine component may provide functionality to annotate the visible objects and store the annotation data in a separate file from the underlying document without modifying the underlying document. In addition, the overlay system may be implemented without the overlay component and the engine component being functionally separate components. Rather, the functionality of the overlay component and the engine component can be integrated into a single component. Furthermore, the functionality could alternatively be divided into many components that combine to provide the overall functionality of the overlay system. Accordingly, the invention is not limited except as by the appended claims.

I claim:

1. A computing device including at least one hardware processor and memory storing computer instructions, the computer instructions for providing an overlay window for a spreadsheet application, the spreadsheet application cooperating with a presentation manager for providing its user interface to a user, the user interface displaying a representation of stored spreadsheet data of the spreadsheet application, the computer instructions comprising:
   an overlay component that
      registers with the presentation manager to receive first events of the user interface of the spreadsheet application;
      registers with the spreadsheet application to receive second events of the spreadsheet application;
      tracks which cells of the spreadsheet application are currently visible on the user interface;
      displays a first overlay window over a first set of cells of the spreadsheet application that are currently visible on the user interface; and
      when at least one particular event of said first events and said second events indicates a change in which of the cells of the spreadsheet application are currently visible, such that a second set of cells of the spreadsheet application become currently visible, displays a second overlay window to overlay the newly currently visible second set of cells of the spreadsheet application with overlay elements; and
   an engine component that
      facilitates collecting and storing augmentation data for the spreadsheet application separately from and without modifying the stored data of the spreadsheet application;
      receives a particular request from the overlay component to generate a new overlay window with the overlay elements, the overlay elements being derived from the augmentation data; and
      when the particular request is received from the overlay component, generates the new overlay window with the overlay elements; and wherein
   the second set of cells of the spreadsheet application may be seen through the second overlay window;
   at least one particular cell of the spreadsheet application is included in both the first set of cells and the second set of cells;
   a particular overlay element associated with the particular cell has a predetermined position relative to the particular cell in the first overlay window;
   the particular cell has a different location under the second overlay window than under the first overlay window; and
   the predetermined position of the particular overlay element relative to the particular cell is maintained in the second overlay window.

2. The computing device of claim 1 wherein the display of an overlay window includes requesting the engine component to generate an overlay window.

3. The computing device of claim 1 wherein the overlay component interacts with different engine components that provide different functionality for generating augmentation data.

4. The computing device of claim 1 wherein the engine component registers to receive events from the spreadsheet application and notifies the overlay component when an event of the spreadsheet application occurs.

5. The computing device of claim 1 wherein the overlay component registers to receive events relating to a window through which the spreadsheet application provides its use interface.

6. The computing device of claim 5 wherein the overlay component displays the overlay window using a layering feature of the presentation manager.

7. The computing device of claim 1 wherein the engine component provides a display object for each area of the user interface over which the overlay window is to overlay with an overlay element.

8. The computing device of claim 7 wherein the engine component provides to the overlay component a display object for each area of the user interface that is visible and that is to be overlaid with an overlay element.

9. The computing device of claim 8 wherein the overlay component invokes methods of the provided display objects to generate the overlay window.

10. The computing device of claim 1, wherein the overlay component and the engine component reside on a same machine.

11. The computing device of claim 1, wherein the augmentation data is collected based on prior input from a user.

12. The computing device of claim 1, wherein the augmentation data associates one or more of the overlay elements with particular ones of the cells of the spreadsheet application.

13. A method of providing an overlay window for a spreadsheet application, the spreadsheet application cooperating with a presentation manager for providing its user interface to a user, the user interface displaying representations of stored spreadsheet data of the spreadsheet application, the method comprising:
  registering with the presentation manager to receive first events of the user interface of the spreadsheet application;
  registering with the spreadsheet application to receive second events of the spreadsheet application;
  collecting augmentation data associated with particular cells of the spreadsheet application and storing the augmentation data separately from the stored spreadsheet data;
  tracking which cells of the spreadsheet application are currently visible on the user interface;
  displaying a first overlay window over a first set of cells of the spread sheet application that are currently visible on the user interface, the first overlay window including a first set of overlay elements corresponding to a first portion of the stored augmentation data, a particular overlay element of the first set of overlay elements being positioned within the first overlay window relative to an associated cell of the spreadsheet application; and
  when at least one particular event of the first events and the second events indicates a change in which of the cells of the spreadsheet application are currently visible, such that a second, different set of cells of the spreadsheet application including the associated cell become currently visible,
    requesting an engine component to generate a second overlay window with a second set of overlay elements of the engine component corresponding to a second portion of the stored augmentation data, the second set of overlay elements including the particular overlay element of the first set of overlay elements, the engine component including computer instructions executable by at least one hardware processor; and
    displaying the generated second overlay window to overlay the newly visible second set of cells of the spreadsheet application such that the position of the particular one of the first set of overlay elements with respect to the associated cell of the spreadsheet application is maintained; and wherein
  the representations of the stored spreadsheet data are at least partially visible through the second overlay window.

14. The method of claim 13 including registering to receive events from the engine component, the events relating to the spreadsheet application.

15. The method of claim 13 wherein overlay elements are derived from augmentation data and the engine component stores augmentation data separately from the stored data of the spreadsheet application.

16. The method of claim 13 wherein the requesting of the engine component to generate an overlay window includes retrieving from the engine component references to display objects for areas of the user interface over which the overlay window is to overlay.

17. The method of claim 16 wherein the requesting of the engine component to generate an overlay window includes invoking a method of referenced display objects to generate overlay elements of the overlay window.

18. The method of claim 13 wherein the overlay window is displayed using a layering feature of the presentation manager.

19. The method of claim 13 wherein at least some of the events of the presentation manager are received as a result of subclassing with a window of the user interface of the spreadsheet application.

20. The method of claim 13, wherein requesting the engine component to generate the overlay window includes requesting an engine component residing on a same machine as the spreadsheet program to generate the overlay window.

21. The method of claim 13, further comprising:
  generating augmentation data based on prior input from a user; and
  storing the augmentation data; and wherein
  the overlay window is generated based on the augmentation data.

22. The method of claim 13, wherein the augmentation data associates one or more of the overlay elements with particular ones of the cells of the spreadsheet.

23. A computer-readable storage medium, that is not a transitory, propagating signal, containing instructions for controlling a computer to provide an overlay window for a spreadsheet application, the spreadsheet application cooperating with a presentation manager for providing its user interface to a user, the user interface displaying representations of stored spreadsheet data of the spreadsheet application, by a method comprising:
  providing a user interface through which augmentation data associated with particular cells of the spreadsheet application is collected and stored separately from the stored spreadsheet data of the spreadsheet application;
  displaying a first overlay window over a first set of cells of the spreadsheet application that is currently visible, the first overlay window including a first set of overlay elements corresponding to a first portion of the stored augmentation data associated with the first set of cells;
  receiving from an overlay component a request to generate a second overlay window when the presentation manager indicates that the first set of cells of the spreadsheet application is no longer visible and that a second, different set of cells of the spreadsheet application is now visible, the overlay component including computer instructions executable by at least one hardware processor; and
  when the request is received from the overlay component, generating the second overlay window with an to include a second set of overlay elements corresponding to a second portion of the stored augmentation data associated with the second set of cells, and
  wherein the overlay component displays the second overlay window over newly displayed second set of cells of the spreadsheet application, and the representations of the stored spreadsheet data associated with underlying cells of the spreadsheet application may be at least partially seen through the overlay window; and at least one particular cell of the spreadsheet application is included in both the first set of cells and the second set of cells;

a particular overlay element associated with the particular cell has a predetermined position in the first overlay window;

the particular overlay element has a different location in the second overlay window than in the first overlay window; and the position of the particular overlay element relative to the particular cell is the same in both the first overlay window and the second overlay window.

24. The computer-readable storage medium of claim 23 wherein the overlay component determines that different cells of the spreadsheet application are now visible based on events from the presentation manager and the spreadsheet application.

25. The computer-readable storage medium of claim 23 wherein the method additionally includes providing to the overlay component references to display objects for areas of the user interface over which the overlay window is to overlay so that the overlay component can invoke methods of the display objects to generate the overlay window.

26. The computer-readable storage medium of claim 23 wherein the method additionally includes registering to receive events of the spreadsheet application and notifying the overlay component when an event occurs that should result in generation of a new overlay window.

27. The computer-readable storage medium of claim 23, further including code defining the overlay component.

28. The computer-readable storage medium of claim 23, wherein the augmentation data is based on prior input from a user, the prior input being associated with at least one particular cell of a spreadsheet.

29. The computer-readable storage medium of claim 23, wherein the augmentation data associates one or more of the overlay elements with particular ones of the cells of the spreadsheet.

30. A method in a computing device for providing an overlay window for a spreadsheet application, the spreadsheet application cooperating with a presentation manager for providing its user interface to a user, the user interface displaying representations of stored spreadsheet data of the spreadsheet application, the method comprising:

registering with the presentation manager to receive first events of the user interface of the spreadsheet application;

registering with the spreadsheet application to receive second events of the spreadsheet application;

tracking using events of the first events and the second events to track which cells of the spreadsheet application are currently visible on the user interface of the spreadsheet application;

collecting augmentation data associated with cells of the spreadsheet application and storing the collected augmentations data separately from the stored spreadsheet data of the spreadsheet application;

displaying a first overlay window over a first set of cells of the spreadsheet application that are currently visible on the user interface, the first overlay window including a first set of overlay elements corresponding to a first portion of the stored augmentation data associated with the first set of cells of the spreadsheet application; and when a particular event of the first events and the second events indicates that the first set of cells is no longer visible and that a second, different set of cells of the spreadsheet application is currently visible, generating a second overlay window including a second set of overlay elements based on a second portion of the augmentation data associated with the second set of cells of the spreadsheet application to augment the second cells of the spreadsheet application that are currently visible; and displaying the generated second overlay window to overlay and augment the second set of cells of the spreadsheet application that are currently visible, and wherein when visibility of the cells of the spreadsheet application changes, the overlay window is regenerated and redisplayed so the currently visible cells, including newly visible cells, of the spreadsheet application are augmented based on a related portion of augmentation data associated with the currently visible set of cells and the representations of the stored spreadsheet data associated with the currently visible set of cells may be at least partially seen through the overlay window;

at least one particular cell of the spreadsheet application is included in both the first set of cells and the second set of cells;

a particular overlay element associated with the particular cell has a predetermined position in the first overlay window;

the particular overlay element has a different location in the second overlay window than in the first overlay window; and the position of the particular overlay element relative to the particular cell is the same in both the first overlay window and the second overlay window.

31. The method of claim 30 wherein the generating of the second overlay window includes retrieving references to display objects for areas of the user interface over which the second overlay window is to overlay.

32. The method of claim 31 wherein a method of the referenced display objects is invoked to generate portions of the second overlay window.

33. The method of claim 30 wherein the second overlay window is displayed using a layering feature of the presentation manager.

34. The method of claim 30 wherein at least some events of the presentation manager are received as a result of subclassing with a window of the user interface of the spreadsheet application.

35. The method of claim 30 wherein the second overlay window includes an overlay element for receiving user input relating to the augmentation data, the overlay element including computer instructions executable by at least one hardware processor.

36. The method of claim 30, further comprising generating the augmentation data based on prior input from a user.

37. The method of claim 30, wherein the augmentation data associates one or more of the overlay elements with particular ones of the cells of the spreadsheet.

* * * * *